E. Pratt,
Saw.
Nº 3,262.   Patented Sep. 14, 1843.
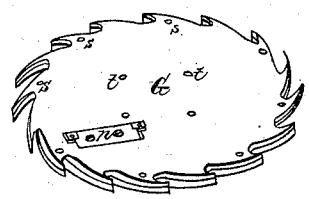

UNITED STATES PATENT OFFICE.

ELIJAH PRATT, OF WASHINGTON COUNTY, NEW YORK.

MANNER OF STIFFENING CIRCULAR SAWS.

Specification of Letters Patent No. 3,262, dated September 14, 1843.

*To all whom it may concern:*

Be it known that I, ELIJAH PRATT, of Washington county, State of New York, have invented a new and useful Combination of Circular-Saw Plates for Sawing; and I do hereby declare that the following is a clear and exact description of the construction and operation of the same, reference being had to the annexed drawing, making part of this specification.

The drawing represents a perspective view of the circular saw plates combined, thus forming the complete saw G. A knife, $n$, is placed in the saw G, and may be used in connection with it for the purpose of planing. The saw plates are two in number, placed one upon the other, and riveted only at, or near their circumference so as to act as levers upon, and stiffen one another.

$s$, $s$, and $s$ are the rivets that fasten the saw plates together.

$t$, and $t$, are rivets that fasten the saw upon a head, when it is to be used for planing with the knife $n$.

What I claim as my invention and desire to secure by Letters Patent, is—

The method of stiffening circular saws as above described, by making them of two separate plates fastened substantially as described.

ELIJAH PRATT.

Witnesses:
B. F. ISHERWOOD,
JOHN R. REMINGTON.